US012708099B2

(12) United States Patent
Hazlehurst

(10) Patent No.: US 12,708,099 B2
(45) Date of Patent: Aug. 18, 2026

(54) WILDLIFE EXCLUSION SYSTEMS AND METHODS

(71) Applicant: CrossTek Electrified Barriers, LLC, Seattle, WA (US)

(72) Inventor: Timothy Hazlehurst, Seattle, WA (US)

(73) Assignee: CROSSTEK ELECTRIFIED BARRIERS, LLC, Seattle, WA (US)

( * ) Notice: Subject to any disclaimer, the term of this patent is extended or adjusted under 35 U.S.C. 154(b) by 0 days.

(21) Appl. No.: 18/759,123

(22) Filed: Jun. 28, 2024

(65) Prior Publication Data

US 2025/0031664 A1 Jan. 30, 2025

Related U.S. Application Data

(63) Continuation of application No. 18/232,740, filed on Aug. 10, 2023, now Pat. No. 12,048,293, which is a continuation of application No. 17/184,311, filed on Feb. 24, 2021, now Pat. No. 11,758,878, which is a continuation of application No. 14/573,969, filed on Dec. 17, 2014, now Pat. No. 10,959,401, which is a continuation of application No. 13/627,886, filed on Sep. 26, 2012, now Pat. No. 8,939,110.

(60) Provisional application No. 61/539,897, filed on Sep. 27, 2011.

(51) Int. Cl.
*A01K 3/00* (2006.01)
*A01M 29/24* (2011.01)
*H05C 1/04* (2006.01)

(52) U.S. Cl.
CPC ............ *A01K 3/004* (2021.08); *A01M 29/24* (2013.01); *H05C 1/04* (2013.01); *Y10S 119/908* (2013.01)

(58) Field of Classification Search
CPC ......... A01K 3/004; A01M 29/24; H05C 1/04; Y10S 119/908
See application file for complete search history.

(56) References Cited

U.S. PATENT DOCUMENTS 520,510 A * 5/1894 Wilson .................. A01K 3/004 256/10
1,254,072 A * 1/1918 Russell .................. E01B 17/00 256/15
1,345,145 A 6/1920 Dominguez
(Continued)

FOREIGN PATENT DOCUMENTS

CA 3 026 348 A1 12/2017
DE 202010017470 U1 * 2/2012 ........... A01M 29/24
(Continued)

*Primary Examiner* — Ebony E Evans
(74) *Attorney, Agent, or Firm* — Seed Intellectual Property Law Group LLP

(57) ABSTRACT

A wildlife exclusion system for railway tracks is provided which includes an exclusion arrangement positioned to span across the railway tracks at a location along a length of the railway tracks. The exclusion arrangement extends generally perpendicular to the railway tracks and has a series of conductive elements spaced apart from each other to form an exclusion are configured to provide an electric shock to wild animals when particular conductive elements within the exclusion area are bridged thereby. Methods of installing a wildlife exclusion system and methods of discouraging wild animals from traveling along railway tracks are also provided.

18 Claims, 7 Drawing Sheets

(56) References Cited

U.S. PATENT DOCUMENTS

| | | | | |
|---|---|---|---|---|
| 1,406,343 | A | 2/1922 | Carden | |
| 1,518,772 | A | 12/1924 | Carden | |
| 1,618,555 | A | 2/1927 | Shaw | |
| 1,769,486 | A | 7/1930 | Bjork | |
| 2,512,740 | A | 6/1950 | Evans | |
| 2,555,180 | A | 5/1951 | Adkins | |
| 2,605,565 | A | 8/1952 | Meyer, Jr. | |
| 3,756,566 | A | 9/1973 | Bangs | |
| 4,265,199 | A | 5/1981 | Hopkins | |
| 5,787,841 | A * | 8/1998 | Titus | A01K 15/023 119/721 |
| 7,249,436 | B2 | 7/2007 | Ravenelle et al. | |
| 7,471,334 | B1 * | 12/2008 | Stenger | G08B 13/19695 348/373 |
| 8,054,186 | B1 | 11/2011 | Ray et al. | |
| 2002/0092481 | A1 * | 7/2002 | Spooner | A01K 3/006 119/712 |
| 2010/0001245 | A1 * | 1/2010 | Drax | A01K 3/002 256/17 |
| 2011/0023792 | A1 | 2/2011 | Osypka | |
| 2014/0317993 | A1 * | 10/2014 | Riddell | A01M 29/26 43/98 |
| 2015/0282471 | A1 | 10/2015 | Lampman et al. | |
| 2021/0368777 | A1 | 12/2021 | Barlow | |

FOREIGN PATENT DOCUMENTS

| | | | |
|---|---|---|---|
| EP | 3 210 464 | A1 | 8/2017 |
| GB | 1 274 197 | | 5/1972 |

* cited by examiner

WILDLIFE EXCLUSION SYSTEMS AND METHODS

CROSS-REFERENCE TO RELATED APPLICATIONS

This application is a continuation of U.S. patent application Ser. No. 18/232,740, filed Aug. 10, 2023, which is a continuation of U.S. patent application Ser. No. 17/184,311, filed Feb. 24, 2021, now U.S. Pat. No. 11,758,878, which is a continuation of U.S. patent application Ser. No. 14/573,969, filed Dec. 17, 2014, now U.S. Pat. No. 10,959,401, which is a continuation of U.S. patent application Ser. No. 13/627,886, filed Sep. 26, 2012, now U.S. Pat. No. 8,939,110, which claims the benefit of U.S. Provisional Patent Application No. 61/539,897, filed Sep. 27, 2011, the entire contents of which are hereby incorporated by reference herein.

BACKGROUND

Technical Field

This disclosure generally relates to systems and methods for discouraging animal wildlife from traveling along railway tracks or entering restricted areas in the vicinity of the railway tracks.

Description of the Related Art

Many types of wildlife that travel on the ground prefer to use railway tracks for movement from one location to another. Bears, deer, elk, sheep, moose, cattle, wolves, foxes and wild horses are examples. The railway tracks provide relatively easy travel when snow is deep in adjacent areas. Railway tracks on bridges provide easier stream or river crossing. Railway tracks through tunnels provide more direct and level routes for moving through mountainous regions. In some cases, wild animals are attracted to the railway track area due to early spring arrival of good forage on the track edges or from grains dropped by the trains travelling on the tracks. In any case, animal wildlife on the tracks is at risk of being injured or killed by trains. Animal wildlife are killed when they try to escape by running down the track with a train approaching as is often the case with bears. Animal wildlife are killed when they are not aware that a train is approaching or when they simply cannot move quickly enough off the track as may happen in the case of a herd of animals on the tracks. Animals may not be able to escape the oncoming train if they are caught on a bridge or in a tunnel. In fact, animal wildlife mortality on railway tracks caused by train impacts is very high in some regions and is threatening the existence of and survival of certain species within several regions of the world. For example, currently the population of grizzly bears in Banff, Canada is thought to be at a population of about sixty individuals. It is believed that grizzly bears are being killed on railway tracks at a rate higher than the rate at which the bears can reproduce new offspring.

It is common to build fences running parallel to the tracks to keep animal wildlife off the tracks. However, at some point the fence must end which leaves an opening to the track. Gates are typically not installed across fence ends or across bridge or tunnel openings, as doing so would impede the movement of trains on the tracks. Furthermore, fences effectively block the normal movement and migration of wild animals and therefore openings across the tracks are necessary to allow animals to move from one side of the tracks to the other for migration and other purposes. This requires that the fence end temporarily to allow a channel or corridor across the tracks for movement. Gates are typically not used to prevent animals from turning and traveling up or down the railway tracks rather than traveling across the tracks from one side to the other, as doing so would impede the movement of trains on the tracks.

Train operators have tried using noise, harassment, foul tasting sprays on track side food sources and beds of upright wooden dowel rods (i.e., "peg boards") along the railway to deter and prevent movement down the railway by animals. None of these devices have been satisfactory in preventing animal movement on the railway.

BRIEF SUMMARY

The wildlife exclusion systems and methods described herein provide reliable mechanisms for deterring animal wildlife from traveling along railways or entering restricted areas in the vicinity of the tracks, while not interfering with train travel. The systems may prevent, for example, wild animals from crossing bridges, entering tunnels, or traveling up or down railway tracks. The systems may also provide for safe travel across the tracks while minimizing or substantially eliminating the risk of collisions by oncoming trains.

According to one embodiment, a wildlife exclusion system for railway tracks may be summarized as including an exclusion arrangement positioned to span across the railway tracks at a location along a length of the railway tracks, the exclusion arrangement extending generally perpendicular to the railway tracks and including a series of conductive elements spaced apart from each other to form an exclusion area configured to provide an electric shock to wild animals when particular conductive elements within the exclusion area are bridged thereby, the exclusion arrangement having a central portion disposed between the railway tracks and opposing end portions on opposing sides of the railway tracks.

A central portion of the exclusion arrangement may include a mat arrangement that may extend substantially entirely between the railway tracks and may have a generally planar upper surface offset below an upper surface of the railway tracks. A portion of the opposing end portions of the exclusion arrangement may decline from an upper end of the railway tracks toward a bed of the railway tracks. Opposing end portions of the exclusion arrangement may extend from a respective one of the railway tracks to a respective barrier, the barriers and the exclusion arrangement collectively defining a wildlife boundary. For example, opposing end portions of the exclusion arrangement may extend from the railway tracks to an end of a fence system.

The exclusion arrangement may be formed as a mat arrangement having a plurality of interconnecting planks or it may be formed as a mat arrangement with a solid large sheet, each plank or sheet configured to receive at least two of the series of conductive elements. In other instances, the exclusion arrangement may include a plurality of support members intermittently supporting the series of conductive elements in a suspended manner. The plurality of support members may be elongated beams oriented transverse to a longitudinal length of the series of conductive elements. The conductive elements may be positioned to extend generally parallel to the railway tracks, and an end one of the conductive elements on each of the opposing end portions of the exclusion arrangement may be spaced in close proximity (e.g., within about three inches) to a respective one of the railway tracks. The conductive elements of the exclusion arrangement and the railway tracks may be configured to have positive and negative poles in an open circuit and to produce an electric shock when the open circuit is completed by wild animals attempting to cross the exclusion arrangement. At least a portion of the exclusion arrangement may be embedded in a surrounding area of the railway tracks such that the portion is generally flush with a ground surface of the surrounding area.

The wildlife exclusion system may further include a power source selectively coupled to a first group of the conductive elements to form an open circuit between the first group of the conductive elements and a second group of the conductive elements. The conductive elements of the first group and the conductive elements of the second group may be positioned to alternate over a length of the exclusion arrangement.

The wildlife exclusion system may further include a detection system coupled to the power source to selectively form the open circuit in response to a detection of wild animals in a vicinity of the exclusion arrangement. The detection system may be configured to selectively generate at least one of a control signal and a warning signal in response to a detection of wild animals in a vicinity of the exclusion arrangement.

Opposing end portions of the exclusion arrangement may include a respective support system coupleable to railway ties underlying the railway tracks, the support system supporting the respective end portion in close proximity to a respective one of the railway tracks.

In some embodiments, a complementary exclusion arrangement may be positioned to span across the railway tracks at a second location along the length of the railway tracks offset from the position of the first exclusion arrangement to form a passage area between the exclusion arrangements for animals to cross from one side of the tracks to the other.

In some embodiments, the exclusion arrangement may further include a device coupled thereto to attract wildlife to a conditioning area of the exclusion arrangement. The device may be, for example, a bait receptacle positioned beneath the series of conductive elements within the conditioning area.

In some instances, the exclusion arrangement of the wildlife exclusion system may include at least two distinct exclusion regions of different form. For example, one section may be in the form of an electrified mat and another section may be in the form of elongated conductive elements suspended above the ground.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and techniques associated with wildlife exclusion and wildlife monitoring systems and methods may not be shown or described in detail to avoid unnecessarily obscuring descriptions of the embodiments. For instance, well known power distribution systems may be used to supply power to the systems described herein for shocking wildlife animals in a safe yet effectively deterring manner.

Unless the context requires otherwise, throughout the specification and claims which follow, the word “comprise” and variations thereof, such as, “comprises” and “comprising” are to be construed in an open, inclusive sense, that is as “including, but not limited to.”

Reference throughout this specification to “one embodiment” or “an embodiment” means that a particular feature, structure or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

As used in this specification and the appended claims, the singular forms “a,” “an,” and “the” include plural referents unless the content clearly dictates otherwise. It should also be noted that the term “or” is generally employed in its sense including “and/or” unless the content clearly dictates otherwise.

Figure 1:
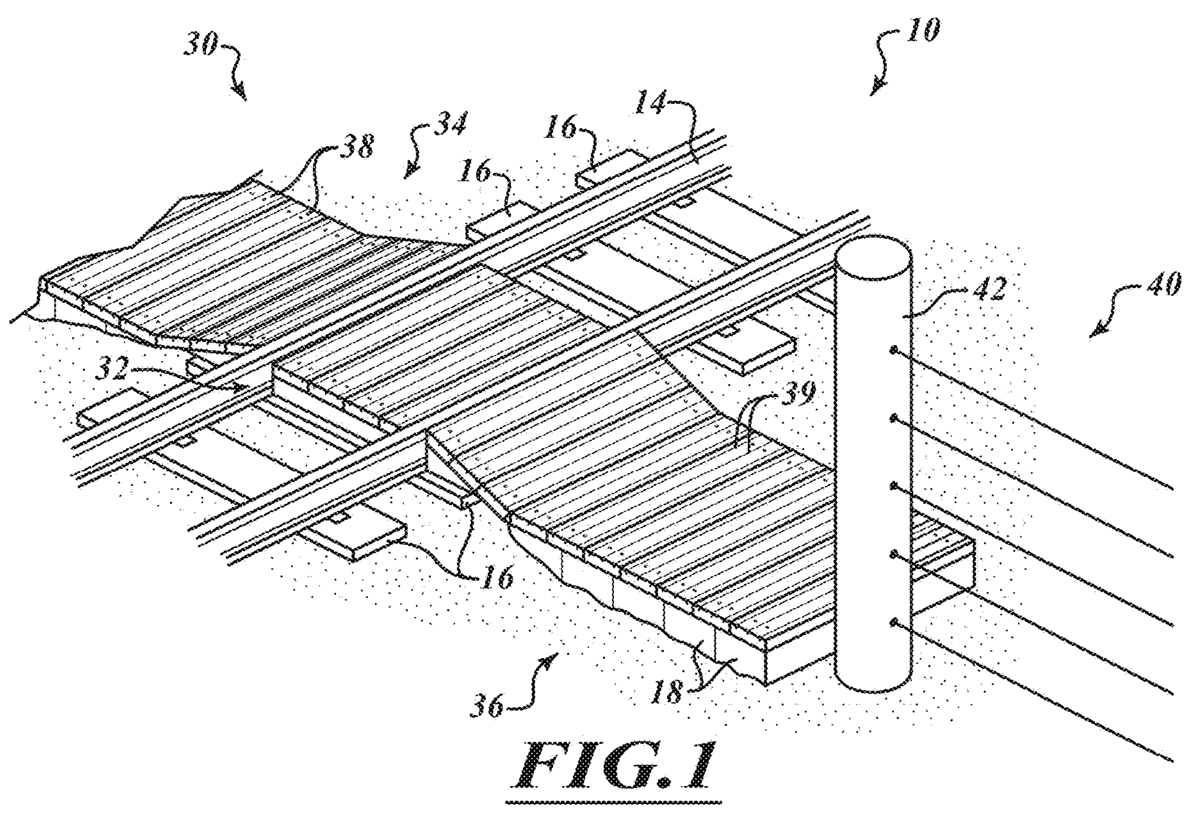
FIG. 1 is an isometric view of a portion of a wildlife exclusion system, according to one embodiment.

FIG. 1 shows a wildlife exclusion system 10 according to one example embodiment spanning across railway tracks 14 supported by transverse railways ties 16 embedded in the ground. The wildlife exclusion system 10 includes an exclusion arrangement 30 in the form of a platform or mat that is positioned to span across the railway tracks 14 generally perpendicular to the railway tracks 14 with a central portion 32 disposed between the railway tracks and opposing end portions 34, 36 disposed on opposing sides of the railway tracks 14. The portions 32, 34, 36 of the exclusion arrangement 30 may be formed of modular components, such as, for example, abutting or interconnecting modular planks 38 arranged in a series to form a generally elongated mat structure. The planks 38 are preferably constructed of a non-conductive or insulating material, such as, for example, wood, plastic, fiberglass or other appropriate materials. Each of the planks 38 may further include a series of conductive elements 39 spaced apart from each other to form an exclusion area configured to provide an electric shock to wild animals when certain conductive elements are bridged thereby. For instance, in some embodiments, an open circuit may be established between alternating conductive elements 39 of the exclusion arrangement 30, which generate a painful shock when the circuit is completed by an animal stepping on the arrangement 30 and bridging conductive elements 39 having opposite poles. In other embodiments, an upper portion or layer of the exclusion arrangement 30 may be formed as a continuous sheet with conductive elements 39 received therein.

The exclusion arrangement 30 may be constructed so as to be removed in modular sections for track repair and maintenance activity in the area occupied by the exclusion arrangement 30 and then reinstalled when track maintenance is complete. In this manner, the arrangement 30 provides a particularly unobtrusive system for preventing wild animals from traveling along the tracks or from entering restricted areas.

The exclusion arrangement 30 is designed to span between opposing barriers on respective sides of the railway tracks 14, such as, for example, a fence structure 40, a barricade, natural barrier or other barrier, so that the opposing barriers and the exclusion arrangement 30 collectively form a boundary for animal wildlife that is effectively impenetrable to wild animals due to the deterrent nature of the exclusion arrangement 30, yet which does not impede or otherwise interfere with the movement of trains or other vehicles moving along the railway tracks 14. In some embodiments, the exclusion arrangement 30 may span between opposing end posts 42 of a fence system 40, as partially illustrated in FIG. 1. The exclusion arrangement 30 deters animals from crossing the fence line in a region where the railway tracks penetrate the fence system 40. In this manner, wild animals may be retained on one side of the fence system 40 in an area unrestricted to animal wildlife.

Figure 2:
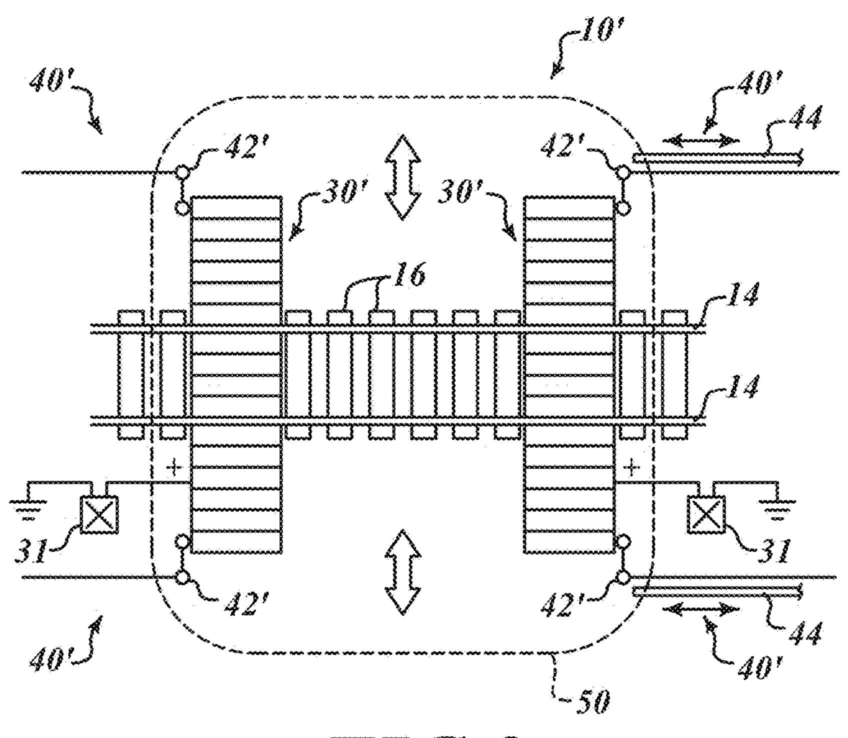
FIG. 2 is a top plan diagram of a wildlife exclusion system, according to another embodiment.

FIG. 2 is diagram of a wildlife exclusion system 10' according to one example embodiment which includes a pair of exclusion arrangements 30' spanning across railway tracks 14 to form a passage or corridor extending across the railway tracks 14. The pair of exclusion arrangements 30' may be positioned to span between opposing fence systems 40' running parallel to the tracks 14 on each side thereof. More particularly, the exclusion arrangements 30' may extend between end posts 42' of the opposing fence systems 40' such that the exclusion arrangements 30' and opposing fence systems 40' create outwardly facing U-shaped boundaries that project along the length of the tracks 14 in both directions. Similar to the description above, the exclusion arrangements 30' may include a series of conductive elements (not shown) spaced apart from each other to form an exclusion area configured to provide an electric shock to wild animals that attempt to cross the arrangements 30'. For instance, in some embodiments, an open circuit may be established between alternating conductive elements of each exclusion arrangement 30', which generates a painful shock when the circuit is completed by an animal stepping on one of the arrangements 30' and bridging conductive elements of opposite poles. In this manner, animals are discouraged from turning up or down the tracks 14 as they move or migrate from one side of the tracks 14 to the other, as represented by the double-headed arrows in FIG. 2.

In some particularly advantageous embodiments, the railway tracks 14 themselves may form one of a negative or positive electrode of the open circuit established between conductive elements of the exclusion arrangements 30' during operation to inhibit animals from tightrope walking along the railway tracks 14 to cross the arrangements 30'. In this configuration, the wildlife exclusion system 10 is particularly effective in preventing a large variety of animal wildlife from entering undesired or restricted areas along the tracks, including bears in particular.

In the embodiment of the wildlife exclusion system 10' depicted in FIG. 2, the areas in which wild animals may cross the tracks 14 is controlled to specific passage areas 50 which may be closely monitored to protect against train collisions. For instance, in some embodiments, monitoring and sensing devices, such as, for example, motion detectors, infrared sensors and other sensing devices, may be integrated into the system 10' to monitor the passage area 50 for the presence of wild animals and selectively activate or deactivate the exclusion arrangements 30' in response to the same. In addition, warning and/or control signals may be generated for alerting others, such as, for example, railway conductors or other railway personnel, to potential collision conditions.

Detection systems may be positioned in some embodiments to sense a breach condition corresponding to when an animal unexpectedly darts, leaps or otherwise crosses the exclusion arrangements 30'. The exclusion arrangements 30' may be subsequently deactivated during such breach conditions so as to not deter the animal or animals from returning to the passage or corridor between the exclusion arrangements 30'. In addition, others may be alerted to the breach condition so as to enable evasive action, if needed, such as bringing a train to a stopped condition upstream of the breached arrangement 30'. Detection systems may also be positioned in some embodiments to sense when an animal or animals enter and exit the corridor between the exclusion arrangements 30' so as to track whether one or more animals may be occupying the track section within this corridor. In such an event, others may be alerted to the condition so as to enable evasive action, if needed.

As further shown in FIG. 2, one or more power sources 31 may be electrically coupled to the exclusion arrangements 30' to supply power for shocking animals stepping on the arrangements 30'. The power source 31 may be a battery, mains power, and/or solar power or any alternative power source. The power source 31 may coupled to the conductive elements of the exclusion arrangements 30' to selectively activate the exclusion arrangements 30' in response to the presence of wild animals, for example. In this manner, the exclusion arrangements 30' may remain in a non-energized state when animals are not detected in the vicinity, thereby conserving energy during periods in which the system may not be needed to deter wild animals. In addition, as discussed above, the exclusion arrangements 30' may be deactivated during fault conditions such as an unexpected breach. Accordingly, the systems 10' provide particularly versatile and efficient devices for excluding wild animals from traveling into undesired or restricted areas along the railway tracks 14.

Still further, as shown in FIG. 2, gates 44 may be provided to temporarily close the corridor between the exclusion arrangements 30' and prevent animals from crossing the tracks at this location. The gates 44 may be manually or automatically controlled. The gates 44 may be opened during select time periods when trains are not expected to be passing through the area. In some embodiments, the gates 44 may be vertical swing crossing gates and may provide an electrified barrier to prevent animals from crossing the tracks between the exclusion arrangements 30'. When a train is approaching and no wildlife is detected in the passage area 50, the gates 44 may be closed and remain closed, allowing the train to maintain its travel speed and preventing wildlife from entering the crosswalk as the train passes the area.

Figure 3:
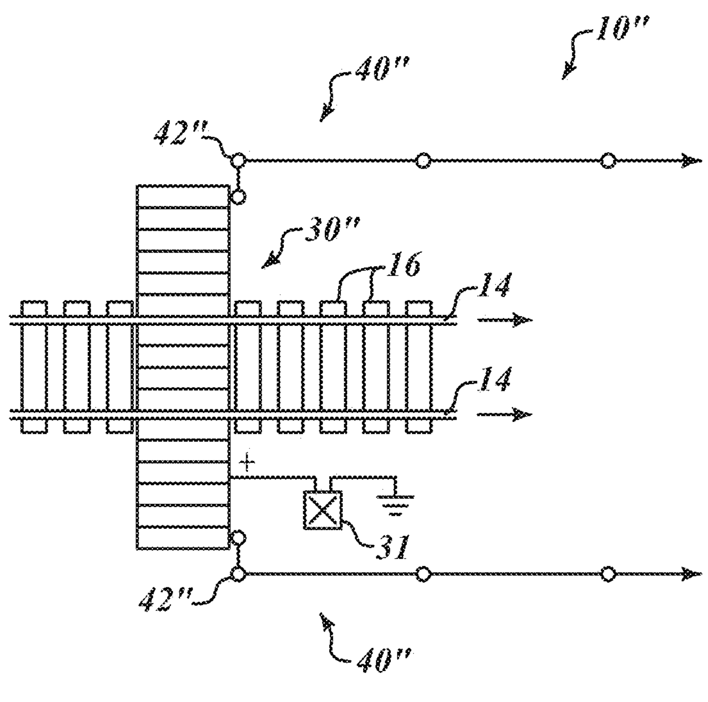
FIG. 3 is a top plan diagram of a wildlife exclusion system, according to yet another embodiment.

FIG. 3 shows another embodiment of a wildlife exclusion system 10" which includes an exclusion arrangement 30" in the form of a single exclusion mat arrangement at the entrance of a fenced in area. More particularly, the exclusion arrangement 30" extends across the railway tracks 14 between end posts 42" of opposing fence systems 40" on each side of the tracks 14. In other embodiments, the exclusion arrangement 30" may span the entrance and exit of a tunnel or a bridge deck. In any event, the exclusion arrangement 30" deters wild animals from crossing the exclusion arrangement 30" and traveling down the tracks, whether through a tunnel, over a bridge or traversing any other structure or terrain. Further, although the embodiment of the wildlife exclusion system 10" is shown as extending between two similar barrier structures (e.g., fence structures 40"), it is appreciated that the wildlife exclusion system 10" may extend between two dissimilar barrier structures, such as, for example, a fence structure 40" on one side of the tracks 14 and a natural rock formation or other barrier on the other side of the tracks 14.

FIGS. 4 through 7 provide views of various aspects of the example embodiment of a wildlife exclusion system 10 described with reference to FIG. 1 above. As shown in FIG. 1, an exclusion arrangement is provided which extends between end fence posts located on opposing sides of railway tracks. The exclusion arrangement includes a central portion positioned between the railway tracks and end portions on each side of the railway tracks. The end portions include a generally planar mat arrangement which inclines at an end near the tracks such that at least one of a plurality of conductive elements embedded in the arrangement is in relatively close proximity to an upper end of a respective railway track.

Figure 4:
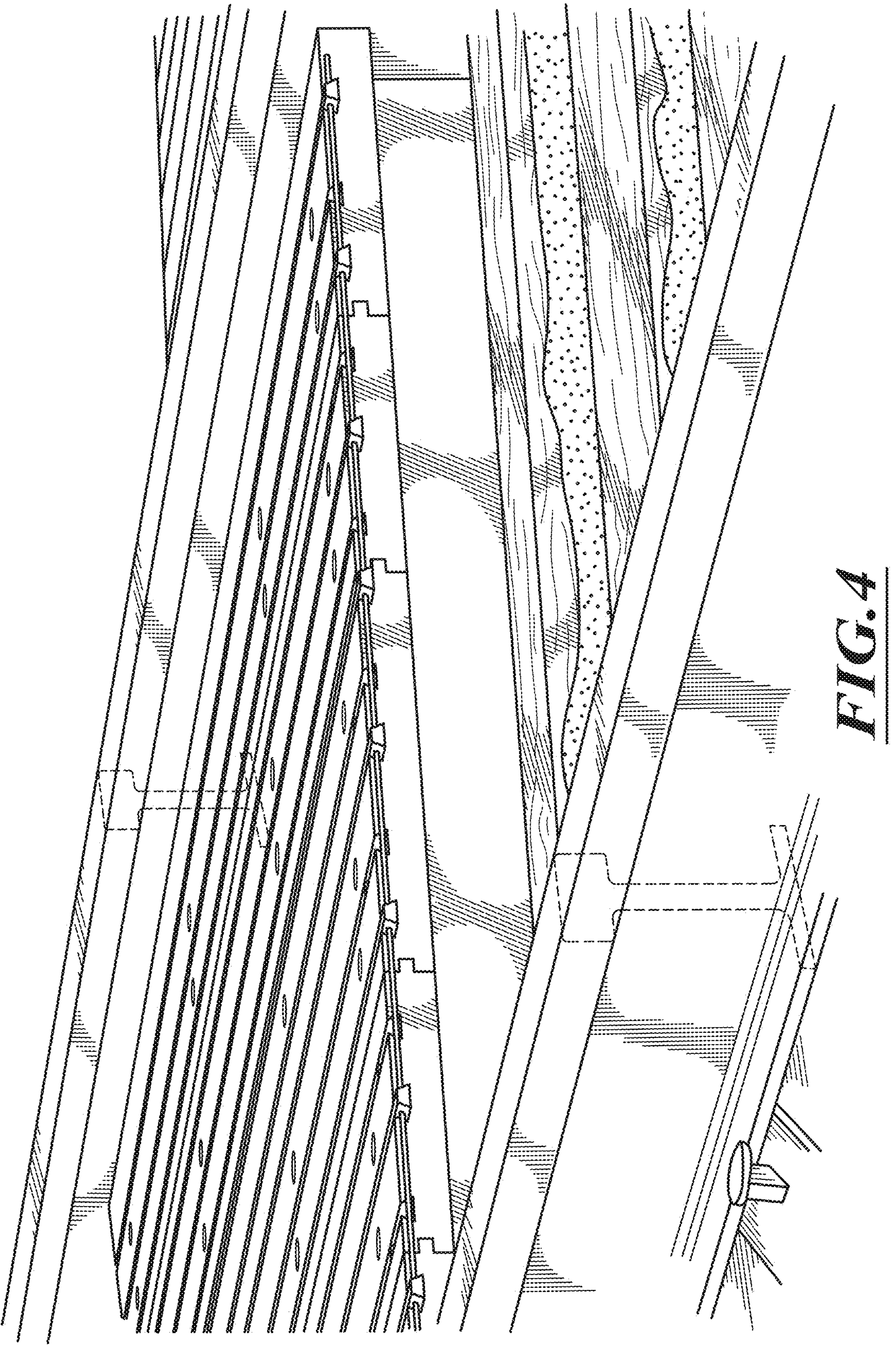
FIG. 4 is a perspective view of a central portion of an exclusion mat arrangement of the wildlife exclusion system of FIG. 1 shown between the tracks.

As shown in FIG. 4, the central portion of the exclusion arrangement may be a mat that extends entirely or nearly entirely between the tracks and provides a generally planar mat area that is offset at a height below an upper surface of the railway tracks. Consequently, the central portion may be positioned to avoid components of a passing train while nevertheless establishing a wild animal barrier in the region between the tracks. A deflection shield or baffle (not shown) may be coupled to leading edge and/or trailing edge of the central portion and other portions of the arrangement to prevent chains or other objects that a train may be dragging from catching on the arrangement or otherwise damaging the arrangement. The deflection shield may comprise, for example, an inclined plate or shield device spanning from the ground in front of the exclusion arrangement to an upper portion of the leading edge of the exclusion arrangement.

As further shown in FIG. 4, the arrangement may form a platform or mat and the conductive elements may be embedded in modular planks of the platform or mat in regular intervals. The conductive elements may be trapezoidal in shape, as shown, or any other suitable shape. In some embodiments, the conductive elements may be relatively thin, elongated elements, as shown, for example, in FIG. 4. In other embodiments, the conductive elements may be relatively wide, such as, for example, planar elements having a width of a foot or greater.

The conductive elements may be configured to extend generally parallel to the tracks along the entire length of the planks. The conductive elements may extend or protrude from an edge of the platform or mat in an alternating manner to facilitate interconnection of alternating ones of the conductive elements. For instance, as shown in FIG. 4, alternating conductive elements may protrude from a first end of the platform or mat and may be coupled together by a conductive rod or other conductive element. The remaining conductive elements may protrude from an opposing end of the platform or mat and may likewise be coupled together by a conductive rod or other conductive element. Accordingly, an electrical potential may be established between the groups of alternating conductive elements. When the system is activated, bridging the gap between adjacent conductive elements or any two conductive elements of opposite polarity will close a circuit and produce an electric shock of high voltage and energy (yet relatively short duration) to deter animals from crossing the platform or mat in a painful yet harmless manner. The systems described herein may activated periodically in a pulsed manner with the pulses occurring with a frequency that is selected to provide one or more shocks to targeted wildlife over the expected duration that it is expected for such wildlife to reasonably traverse the exclusion arrangement. The frequency therefore may be dependent on the type of wildlife that is to be excluded. In addition, the intensity of the shock may also be dependent on the type of wildlife to be excluded. In some embodiments, the frequency and/or intensity may be adjustable.

Figure 5:
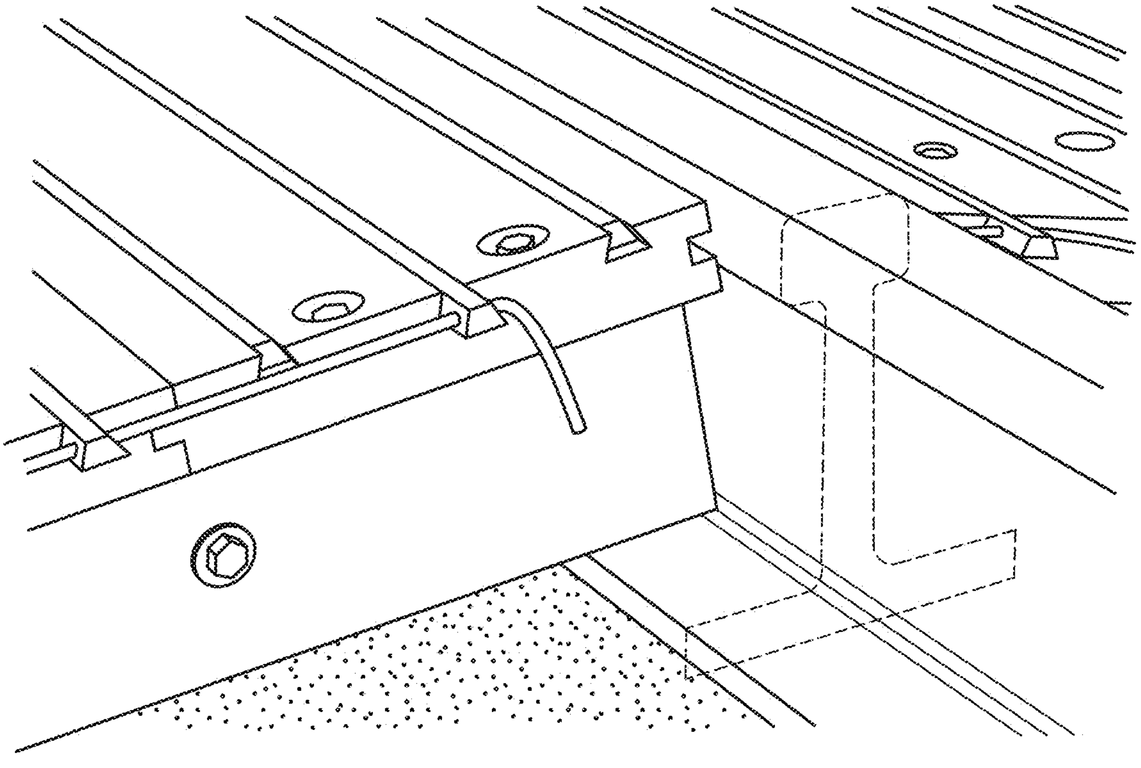
FIG. 5 is a perspective view of an end portion of the exclusion mat arrangement of the wildlife exclusion system of FIG. 1 shown interfacing with one of the railway tracks.
Figure 6:
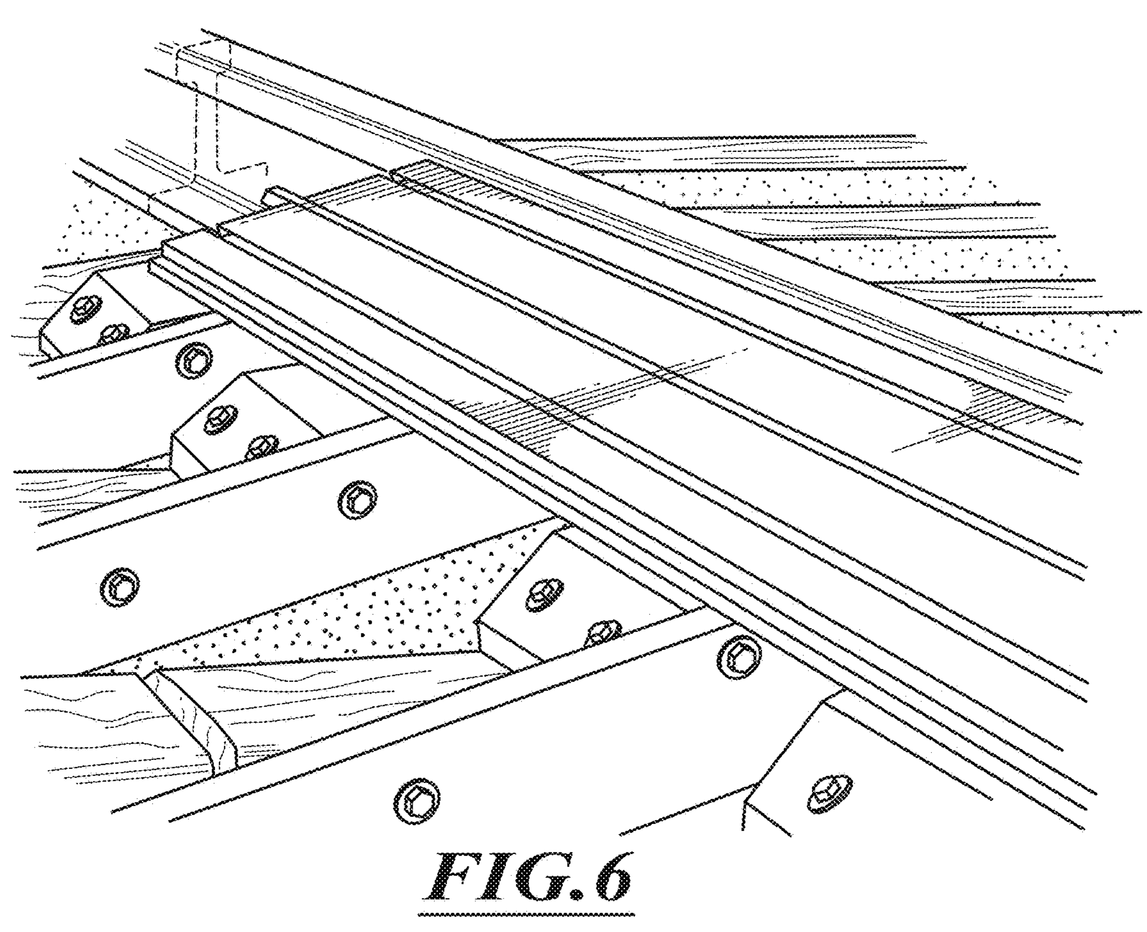
FIG. 6 is a perspective view of an end portion of the exclusion mat arrangement of the wildlife exclusion system of FIG. 1 shown in a partially assembled configuration to reveal an underlying support system.
Figure 7:
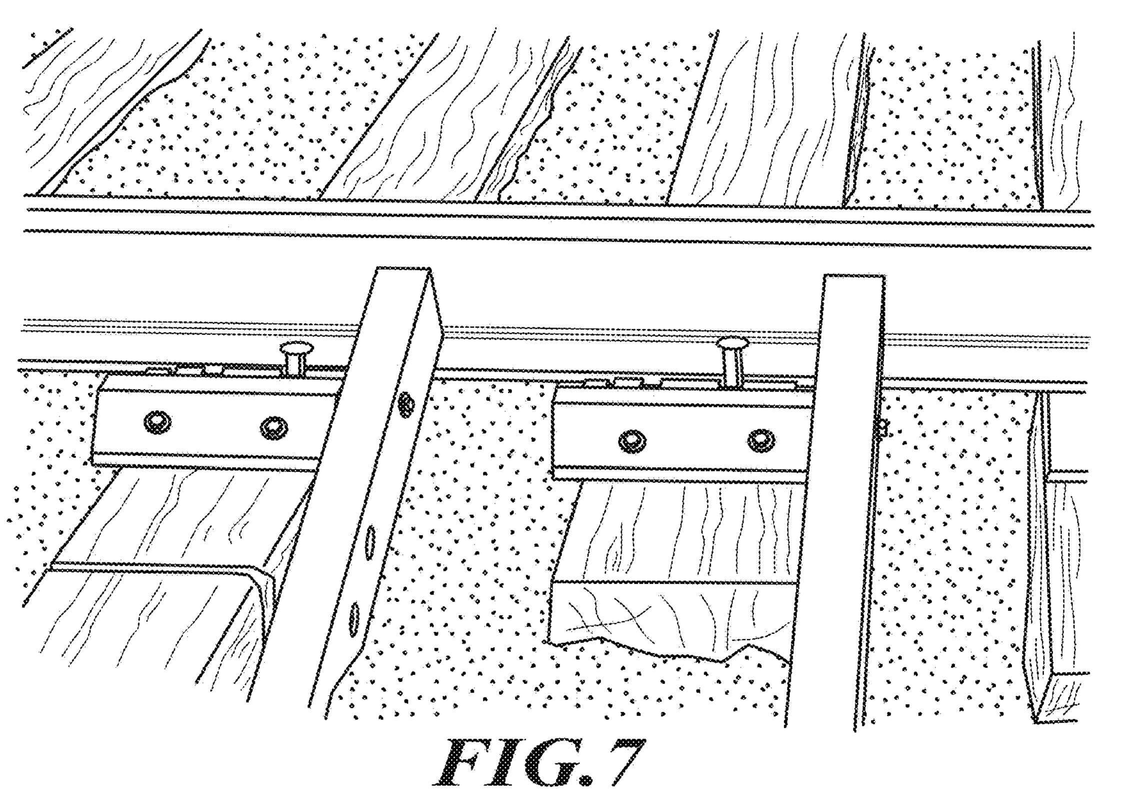
FIG. 7 is a perspective view of a portion of the underlying support system for the end portion of the exclusion mat arrangement of the wildlife exclusion system of FIG. 1.

FIGS. 5 through 7 show additional details of the mounting arrangement of an inclined portion of the end portions of the exclusion arrangement, according to one example embodiment. In this example embodiment, opposing end portions of the exclusion arrangement on each side of the tracks are supported by a respective support system coupleable to the railway ties underlying the railway tracks such that a portion of the end portions lie in close proximity to an upper surface of the railway tracks while declining toward the bed of the railway tracks for at least a short distance. In this manner, at least one of a plurality of the conductive elements in the arrangement may be supported in relatively close proximity to the railway tracks. For example, in the example embodiment, one of the conductive elements runs generally parallel to the track and is positioned within about three inches of the same. The conductive rails of the track itself may be incorporated in the system as either a negative or positive pole in the shock delivery system and interoperate with the adjacent conductive element embedded in the exclusion arrangement to shock animals, such as, for example, bears, which may be attempting to tightrope walk the rails. In some embodiments, the rail is closely spaced to an adjacent conductive element of opposite polarity to produce a painful shock when a paw of a bear, for example, bridges a connection between the same. In this manner, certain animals may be prevented from bypassing the exclusion arrangement via the railway tracks themselves.

In some embodiments, the support system for the exclusion arrangement may be coupled directly to the railway ties so as to move in unison with the same in response to the weight and motion of a train passing over the tracks. FIGS. 5 through 7 illustrate one particularly efficient arrangement for integrating the end portions of the exclusion arrangement with a conventional railway system including wooden railway ties, although it is appreciated that many different arrangements are possible. Irrespective of the support arrangement, it is beneficial to provide an arrangement that closely abuts or interfaces with the railway tracks on each side of the tracks as well as spans between the tracks to form a comprehensive exclusion area, such as, for example, an exclusion mat, platform or bed, which serves as an effective obstruction to the movement of wild animals via shock treatment.

Figure 8:
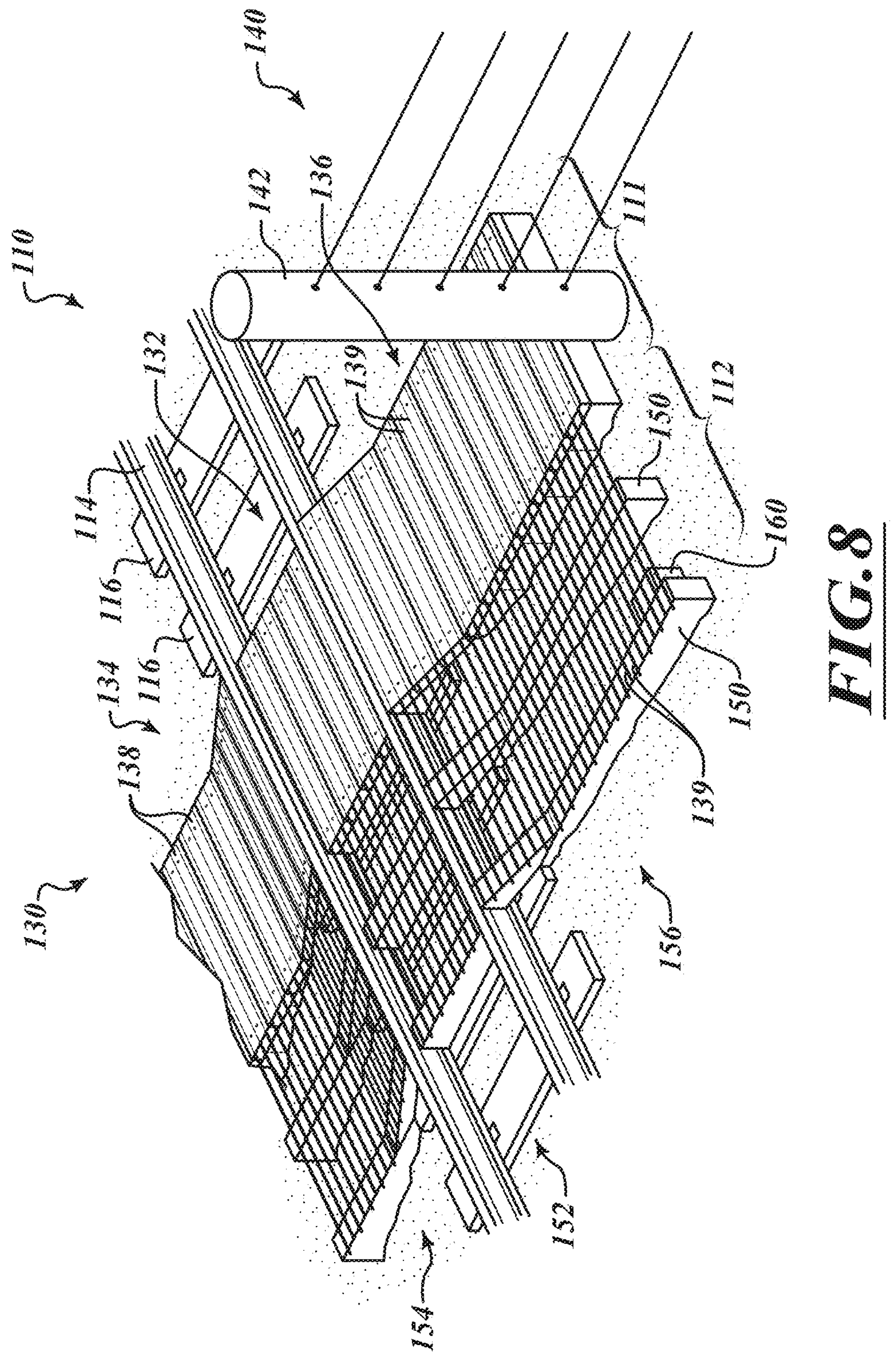
FIG. 8 is an isometric view of a portion of a wildlife exclusion system, according to another embodiment.

FIG. 8 shows a wildlife exclusion system 110 according to another example embodiment having an arrangement 130 with two distinct exclusion regions 111, 112 spanning across railway tracks 114 supported by transverse railways ties 116 embedded in the ground. The wildlife exclusion system 110 includes a first exclusion region 111 in the form of a platform or mat that is positioned to span across the railway tracks 114 generally perpendicular to the railway tracks 114 with a central portion 132 disposed between the railway tracks and opposing end portions 134, 136 disposed on opposing sides of the railway tracks 114. The portions 132, 134, 136 of the first exclusion region 111 may be formed of modular components, such as, for example, abutting or interconnecting modular planks 138 arranged in a series to form a generally elongated mat structure. The planks 138 are preferably constructed of a non-conductive or insulating material, such as, for example, wood, plastic, fiberglass or other appropriate materials. Each of the planks 138 may further include a series of conductive elements 139 spaced apart from each other to form an exclusion area configured to provide an electric shock to wild animals when certain conductive elements are bridged thereby. For instance, in some embodiments, an open circuit may be established between alternating conductive elements 139 of the first exclusion region 111, which generate a painful shock when the circuit is completed by an animal stepping on the exclusion region 111 and bridging conductive elements 139 having opposite poles. In other embodiments, an upper portion or layer of the exclusion region 111 may be formed as a continuous sheet with conductive elements 139 received therein.

The exclusion region 111 is designed to span between opposing barriers on respective sides of the railway tracks 114, such as, for example, a fence structure 140, a barricade, natural barrier or other barrier, so that the opposing barriers and the exclusion region 111 collectively form a boundary for animal wildlife that is effectively impenetrable to wild animals due to the deterrent nature of the exclusion region 111, yet which does not impede or otherwise interfere with the movement of trains or other vehicles moving along the railway tracks 114. In some embodiments, the exclusion region 111 may span between opposing end posts 142 of a fence system 140, as partially illustrated in FIG. 8. The exclusion region 111 deters animals from crossing the fence line in a region where the railway tracks penetrate the fence system 140. In this manner, wild animals may be retained on one side of the fence system 140 in an area unrestricted to animal wildlife.

The example wildlife exclusion system 110 of FIG. 8 further includes a second exclusion region 112 in the form of a series of elevated conductive elements supported by support members 150 in a suspended manner, which are arranged to span across the railway tracks 114 generally perpendicular to the railway tracks 114 with a central portion 152 disposed between the railway tracks and opposing end portions 154, 156 disposed on opposing sides of the railway tracks 114. The portions 152, 154, 156 of the second exclusion region 112 may be formed of elongated conductive elements 139, such as, for example, rods, arranged in a series to form a generally elongated exclusion region. The elongated conductive elements 139 may be an extension of the conductive elements 139 of the first exclusion region 111, as shown in FIG. 8, or may be separate conductive elements that are electrically isolated from the conductive elements of the first exclusion region 111 to be energized independently thereof during operation. The conductive elements of each exclusion region 111, 112 may be activated with different frequency, intensity, and/or duration from each other. For example, the first exclusion region 111 may be configured to deliver a higher intensity shock than the second exclusion region 112.

The conductive elements 139 of the second exclusion region 112 may be supported in an elevated and suspended manner by transverse support members 150. The support members may be constructed of a non-conductive or insulating material, such as, for example, wood, plastic, fiberglass or other appropriate materials. In other embodiments, the support members 150 may be pedestals or other support devices. Preferably, the conductive elements 139 of the second exclusion region 112 are supported intermittently along the lengths thereof to create areas that resemble grating or similar structures and which are difficult for wildlife to traverse easily or quickly. In this manner, the second exclusion region 112 is particularly well adapted to hinder the ability of some wildlife to move quickly across the exclusion arrangement 130. As such, some wildlife may remain in contact with the exclusion arrangement 130, and in particular the second exclusion region 112, for an extended period of time, thereby increasing the likelihood of the exclusion arrangement 130 in delivering a deterrent shock to such wildlife that encounter the system 110. Other devices may be provided at the leading edge or area of the exclusion system 110 to slow or stall the movement of wildlife, such as, for example, upstanding pegs or horizontal rungs.

Like the conductive elements 139 of the first exclusion region 111, the conductive elements 139 of the second exclusion region 112 may be spaced apart from each other to form an exclusion area configured to provide an electric shock to wild animals when certain conductive elements are bridged thereby. For instance, in some embodiments, an open circuit may be established between alternating conductive elements 139 of the second exclusion region 111, which generate a painful shock when the circuit is completed by an animal stepping on the exclusion region 111 and bridging conductive elements 139 having opposite poles. The conductive elements 139 may be spaced to present an arrangement that is particularly cumbersome to traverse, while nevertheless providing a generally comprehensive exclusion area that has a high likelihood of delivering a deterrent shock when certain conductive elements 139 are bridged.

With continued reference to FIG. 8, the first and second exclusion regions 111, 112 may be positioned adjacent to each other to form a comprehensive exclusion arrangement 130. More particularly, as discussed above, the first exclusion region 111 may be positioned to span between opposing barriers on respective sides of the railway tracks 114, such as, for example, a fence structure 140, a barricade, natural barrier or other barrier, so that the opposing barriers and the first exclusion region 111 collectively form a boundary for animal wildlife. The second exclusion region 112 may be positioned adjacent the first exclusion region 111 opposite the area that is to be restricted to wildlife. In this manner, approaching wildlife may first encounter the second exclusion region 112 prior to reaching the first exclusion region 111 in an attempt to enter the restricted area and be deterred by moving forward toward the restricted area by receiving a deterrent shock within the second exclusion region 112 which may be designed to slow or hinder the progress of such wildlife.

Moreover, the exclusion system 110 may include a device 160 to attract the attention of certain wildlife in an attempt to condition such wildlife to the nature of the exclusion system 110. For instance, the device 160 may include a bait receptacle for storing bait to attract certain targeted wildlife to a portion of the system 110, preferably, a remote edge or end of the system 110 opposite the area to be restricted. In some embodiments, a bait receptacle may be positioned beneath the conductive elements 139 of the exclusion arrangement 130 such that the targeted wildlife is coaxed into positioning its head between or among the conductive elements 139, thereby increasing the likelihood of the system 110 delivering a deterrent shock to the targeted wildlife in a particularly sensitive area. It is believed that such wildlife will become conditioned as a result of such a shock or shocks to avoid the system altogether 110. Although the device 160 to attract the attention of certain wildlife (e.g., a bait receptacle) is shown in an isolated location, it is appreciated that a plurality of such devices 160 may be provided in different areas of the exclusion arrangement 130, including, for example, a series of bait receptacles being provided along the edge or leading end of the exclusion arrangement 130. In some embodiments, a bait receptacle or other attractive device 160 may extend along substantially the entire leading edge of the exclusion arrangement 130.

As wildlife first encounters the exclusion arrangement 130, it is possible that the wildlife may step or otherwise contact the exclusion arrangement 130 in an isolated area. The probability of wildlife simultaneously contacting conductive elements 139 of opposite polarity therefore may be diminished during such initial encounters. Accordingly, in some embodiments, it may be beneficial to rely on the conductivity of the surrounding environment to complete a circuit with a live conductive element 139 of the exclusion arrangement 130 to deliver a deterrent shock. However, because the surrounding railroad environment often comprises crushed rock, the conductivity of the ground immediately surrounding the exclusion arrangement 130 may have poor conductivity. To increase the conductivity of the ground surrounding the exclusion arrangement (or a leading portion thereof), a layer or other arrangement of conductive material, such as, for example, metal mesh, may be installed in the ground surrounding the exclusion arrangement 130 and electrically connected to a ground rod that is driven into the earth and/or to the negative pole of the exclusion arrangement 130. With this arrangement, it is more likely that approaching wildlife will be present on a highly conductive ground field when first encountering the exclusion arrangement 130. Thus, when wildlife steps on or otherwise contacts the exclusion arrangement 130, it need only contact a positive polarity conductive element 119 to receive a deterrent shock, thus increasing the effectiveness of the system 110.

Although the example embodiment of the wildlife exclusion system 110 of FIG. 8 is shown as including two distinct exclusion regions 111, 112, it is appreciated that other embodiments may include a single exclusion region having an arrangement of elevated conductive elements 139 as shown and described with respect to the second exclusion region 112 of the illustrated embodiment of FIG. 8. In addition, other embodiments may have three, four or more distinct exclusion regions that may be collectively activated or independently activated. Moreover, although each of the exclusion regions 111, 112 are shown as generally linear arrangements, it is appreciated that one or more of the exclusion regions 111, 112 may be arranged in different configurations, such as, for example, an arcuate arrangement.

Figure 9:
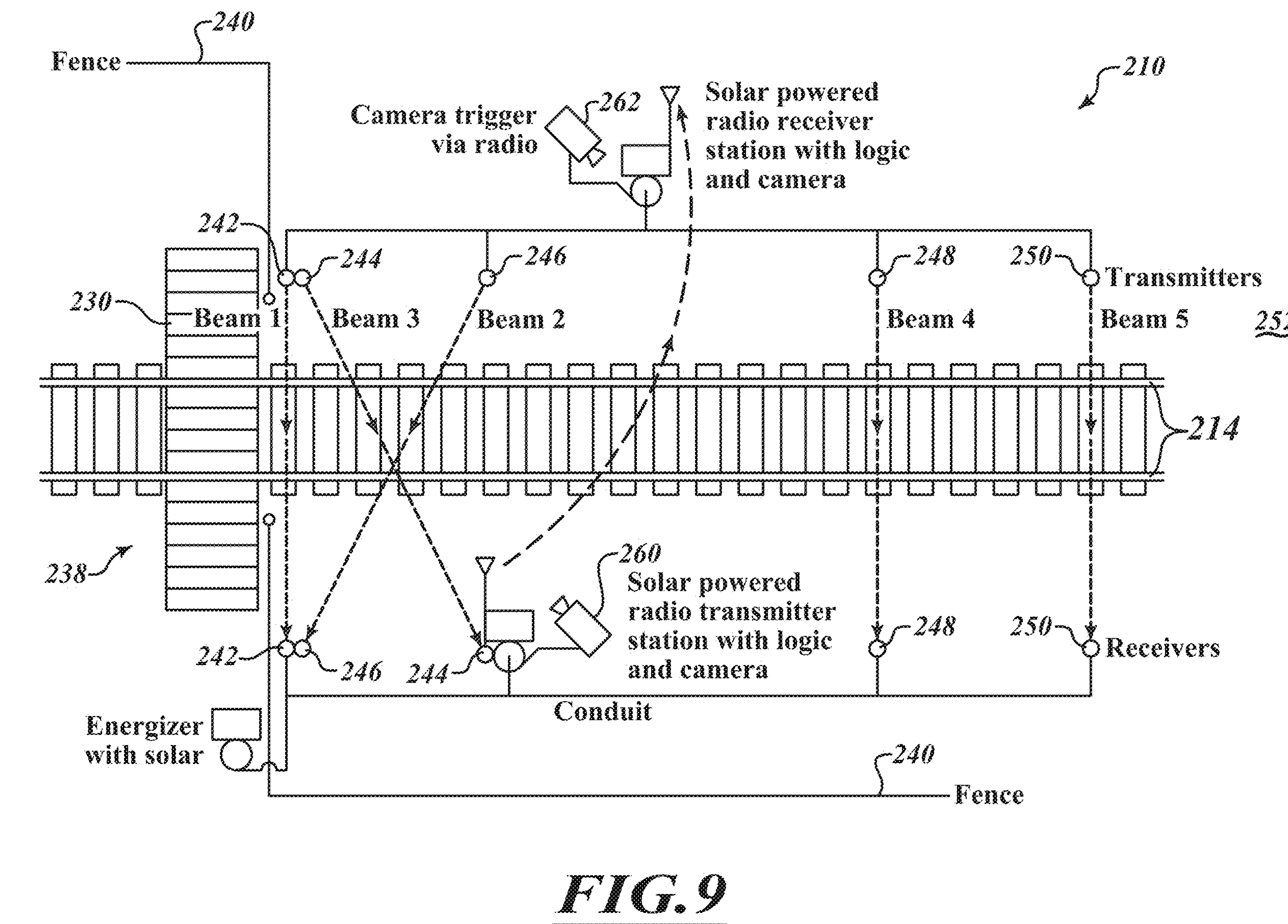
FIG. 9 is a top plan diagram of a wildlife exclusion system, according to yet another embodiment.

FIG. 9 shows a wildlife exclusion system 210 according to yet another example embodiment, which includes an exclusion arrangement 230 spanning across railway tracks 214 at the entrance 238 to a fencing system 240. The exclusion arrangement 230 may be of the various forms described herein, including a mat arrangement, as shown in FIG. 1, a suspended system of conductive elements, as shown in the second region 112 of the exclusion arrangement 130 of FIG. 8, or combinations thereof. The unrestricted side of the fencing system 240 may be provided with various detection sensors and other devices for sensing and monitoring the presence and movement of wildlife to assist in the control of the exclusion system 210. For example, an entrance sensor 242 may be provided at the entrance 238 of the fencing system to detect wildlife entering or exiting the fencing system 240. Intermediate sensors 244, 246 may be provided further along the tracks 214 as shown in FIG. 9 to detect wildlife approaching the entrance 238 to the fencing system 240. In addition, early detection sensors 248, 250 may be provided even further along the tracks 214 to detect wildlife well before they reach the entrance 238 to the fencing system 240. The sensors 242, 244, 246, 248, 250 may be, for example, laser beam interrupt detection sensors.

When an animal moves from within the restricted fenced area 250 through the entrance 238 of the fencing system 430 (i.e., movement through the entrance 238 in FIG. 9 from left to right), the entrance sensor 242 is triggered first and an exit movement signal is generated to signal an exit event. In such situations, the exclusion arrangement 230 may remain inactive. In addition, a camera arrangement 260 may be provided to record images if the subsequent intermediate sensors 244, 246 are broken within a predetermined time frame (e.g., three to four seconds). This will show that wildlife can safely exit the restricted area and also provide feedback regarding what type of wildlife is exiting the restricted area. Conversely, when wildlife approaches from the unrestricted side 252 of the fencing system 430 along the tracks 214 (i.e., right to left in FIG. 9), the early detection sensor 250 is triggered first. Then, if the other early detection sensor 248 is triggered within a predetermined time frame and no other sensors are triggered, another camera arrangement 262 may be provided to record images of the wildlife to gather data corresponding to the approach. Subsequently, if the intermediate sensors 244, 246 are triggered, then the exclusion arrangement 230 may be activated or energized from an inactive state. Warning signals, such as alarms, may also be transmitted to signal a possible breach attempt. The aforementioned camera arrangement 260 may then capture or record additional images of the attempted breach of the exclusion arrangement for research and development purposes.

Although the embodiments shown in the Figures include exclusion arrangements having conductive elements which extend longitudinally from one end of the arrangement to the other, it is appreciated that other configurations are possible, such as, for example, horizontally extending conductive elements, a criss-crossing or lattice pattern of conductive elements, or other arrangements and combinations of the same. For example, in one embodiment, an exclusion arrangement may be provided which combines longitudinally extending conductive elements running parallel to the tracks in a region near the tracks and horizontally extending conductive elements running perpendicular to the tracks in other regions of the exclusion arrangement.

Further, although embodiments are described as including groups of conductive elements which alternate polarity over a width of the arrangement, it is appreciated that the conductive elements may be grouped differently. Irrespective of the positioning of the conductive elements, it is beneficial to position and arrange the conductive elements so that an animal is expected to touch both the negative and positive polarity when stepping on the arrangement, thus receiving a painful shock which motivates the animal to retreat away and not cross the barrier created by the electrified arrangement.

The exclusion arrangements described herein may be active all of the time or turned on and off according to needs. The exclusion arrangements may be manually activated and deactivated with a switch or automatically activated and deactivated with a timer or sensors that detect other operational parameters. For example, as discussed earlier, the exclusion arrangements can be activated and deactivated by sensors that detect certain situations such as the approach of animal wildlife from one or both directions. As another example, the arrangements may be deactivated by a sensor if an animal is trapped in a railway corridor and needs to escape. Sensors may also be configured to detect the presence and movement of wild animals and vehicles on the tracks. In addition, sensors may be used to detect the operating conditions of the exclusion arrangement, including operational parameters of the power source thereof. Still further, sensors may be used to detect night and day, temperature and humidity conditions with which to monitor and control the system. For example, wild animals of a particular type and within a particular region may be more active under certain environmental conditions, and thus by monitoring such environmental conditions, the system may be energized during periods of peak activity.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A wildlife exclusion system, comprising:

an exclusion arrangement including a series of elevated static elongated conductive rods suspended over an open space such that there is an air gap below the elevated static elongated conductive rods, the elongated conductive rods configured to deliver an electric shock to wild animals when particular elevated static elongated conductive rods from the series of elevated static elongated conductive rods within the exclusion arrangement are bridged thereby to close an open circuit in order to discourage the wild animals from entering a restricted area, wherein the series of elevated static elongated conductive rods are spaced apart from each other with insulating material between the elevated static elongated conductive rods to form an exclusion area having a plurality of distinct sets of elevated static elongated conductive rods that are electrically insulated from each other by the insulating material.

2. The wildlife exclusion system of claim 1, wherein a first portion of the series of elevated static elongated conductive rods is of opposite polarity of a second portion of the series of elevated static elongated conductive rods, such that the wild animals may bridge a connection between the first portion of the series of elevated static elongated conductive rods and the second portion of the series of elevated static elongated conductive rods.

3. The wildlife exclusion system of claim 2, wherein a plurality of elevated static elongated conductive rods of the first portion of the series of elevated static elongated conductive rods alternates with a plurality of elevated static elongated conductive rods of the second portion of the series of elevated static elongated conductive rods.

4. The wildlife exclusion system of claim 1, wherein the series of elevated static elongated conductive rods of the exclusion arrangement are supported by insulating material.

5. A wildlife exclusion system, comprising:

an exclusion arrangement including a series of elevated static elongated conductive rods suspended over an open space such that there is an air gap below the elevated static elongated conductive rods, the elongated conductive rods configured to deliver an electric shock to wild animals when particular elevated static elongated conductive rods from the series of elevated static elongated conductive rods within the exclusion arrangement are bridged thereby to close an open circuit in order to discourage the wild animals from entering a restricted area, wherein the plurality of elevated static elongated conductive rods includes openings extending therebetween, and wherein the plurality of elevated static elongated conductive rods and openings therebetween are configured to slow or hinder the progress of the wild animals as the wild animals move in the direction of the restricted area.

6. A wildlife exclusion system, comprising:

an exclusion arrangement including a series of elevated static elongated conductive rods suspended over an open space such that there is an air gap below the elevated static elongated conductive rods, the elongated conductive rods configured to deliver an electric shock to wild animals when particular elevated static elongated conductive rods from the series of elevated static elongated conductive rods within the exclusion arrangement are bridged thereby to close an open circuit in order to discourage the wild animals from entering a restricted area;

one or more monitoring and sensing devices arranged to monitor wild animals in the vicinity of the exclusion arrangement; and a control system operatively coupled to the one or more monitoring and sensing devices and the exclusion arrangement to selectively activate and deactivate the exclusion arrangement in response to the presence and absence of wild animals in the vicinity of exclusion arrangement.

7. The wildlife exclusion system of claim 6, wherein the one or more monitoring and sensing device comprises a motion detector, an infrared sensor and/or a laser beam interrupt detection sensor.

8. A wildlife exclusion system, comprising:

an exclusion arrangement including a series of elevated static elongated conductive rods suspended over an open space such that there is an air gap below the elevated static elongated conductive rods, the elongated conductive rods configured to deliver an electric shock to wild animals when particular elevated static elongated conductive rods from the series of elevated static elongated conductive rods within the exclusion arrangement are bridged thereby to close an open circuit in order to discourage the wild animals from entering a restricted area;

at least one monitoring and sensing device arranged to monitor the exclusion arrangement for a breach condition in which one or more wild animals pass over the exclusion arrangement; and a control system operatively coupled to the at least one monitoring and sensing device and the exclusion arrangement to selectively deactivate the exclusion arrangement in response to the breach condition.

9. A wildlife exclusion system, comprising:

an exclusion arrangement including one or more elevated static elongated conductive rods suspended over an open space such that there is an air gap below the elevated static elongated conductive rods, the elongated conductive rods configured to deliver an electric shock to a wild animal when contacted by the wild animal to close an open circuit in order to discourage the wild animal from entering a restricted area, wherein the one or more elevated static elongated conductive rods are spaced apart from each other with insulating material between the elevated static elongated conductive rods to form an exclusion area having a plurality of distinct sets of elongated conductive rods that are electrically insulated from each other by the insulating material.

10. The wildlife exclusion system of claim 9, wherein the exclusion arrangement includes two or more elevated static elongated conductive rods, and wherein a first elevated static elongated conductive rod of the series of elevated static elongated conductive rods is of opposite polarity of a second portion of the elevated static elongated conductive rods, such that the wild animals may bridge a connection between the first portion of the series of elevated static elongated conductive rods and the second portion of the series of elevated static elongated conductive rods.

11. The wildlife exclusion system of claim 9, wherein the one or more elevated static elongated conductive rods of the exclusion arrangement are supported by insulating material.

12. A wildlife exclusion system, comprising:

a first exclusion arrangement including a series of elevated static elongated conductive rods that are configured to deliver an electric shock to wild animals when particular elevated static elongated conductive rods from the series of elevated static elongated conductive rods within the exclusion arrangement are bridged thereby to close an open circuit in order to discourage the wild animals from entering a restricted area; and a second exclusion arrangement positioned immediately adjacent the first exclusion arrangement, wherein the second exclusion arrangement presents a grate structure with openings and is configured to slow or hinder the progress of the wild animals as the wild animals move in the direction of the restricted area.

13. The wildlife exclusion system of claim 12, wherein the second exclusion arrangement includes a series of conductive elements, the conductive elements forming the grate structure with openings and configured to slow or hinder the progress of the wild animals as the wild animals move in the direction of the restricted area.

14. The wildlife exclusion system of claim 13, wherein the series of conductive elements of the second exclusion arrangement is of opposite polarity of at least a portion of the series of elongated conductive rods of the first exclusion arrangement, such that the wild animals may bridge a connection between the at least a portion of the series of elongated conductive rods of the first exclusion arrangement and the second exclusion arrangement.

15. A wildlife exclusion system, comprising:

an exclusion arrangement including a series of elevated static elongated conductive rods that are configured to deliver an electric shock to wild animals when particular elevated static elongated conductive rods from the series of elevated static elongated conductive rods within the exclusion arrangement are bridged thereby to close an open circuit in order to discourage the wild animals from entering a restricted area; and an arrangement of conductive material installed in ground adjacent to the exclusion arrangement and unconnected to a voltage source to increase the conductivity of the ground immediately adjacent to the exclusion arrangement for contact by animal wildlife on the ground of increased conductivity.

16. A wildlife exclusion system, comprising:

a first exclusion arrangement including one or more elevated static elongated conductive rods that are configured to deliver an electric shock to a wild animal when contacted by the wild animal to close an open circuit in order to discourage the wild animal from entering a restricted area; and a second exclusion arrangement positioned immediately adjacent the first exclusion arrangement, wherein the second exclusion arrangement presents a grate structure with openings and is configured to slow or hinder the progress of the wild animals as the wild animals move in the direction of the restricted area.

17. The wildlife exclusion system of claim 16, wherein the second exclusion arrangement includes a series of conductive elements, the conductive elements forming the grate structure with openings and configured to slow or hinder the progress of the wild animals as the wild animals move in the direction of the restricted area.

18. The wildlife exclusion system of claim 17, wherein the series of conductive elements of the second exclusion arrangement is of opposite polarity of the one or more elongated conductive rods of the first exclusion arrangement, such that the wild animals may bridge a connection between the one or more conductive elements of the first exclusion arrangement and the second exclusion arrangement.

* * * * *